Sept. 8, 1959   J. A. PIEKARSKI ET AL   2,903,567
ARC WELDING APPARATUS

Filed Dec. 31, 1956   2 Sheets-Sheet 1

INVENTORS
JULIAN A. PIEKARSKI
JOHN A. RUSSELL
BY
Andrew & Scales
Attorneys

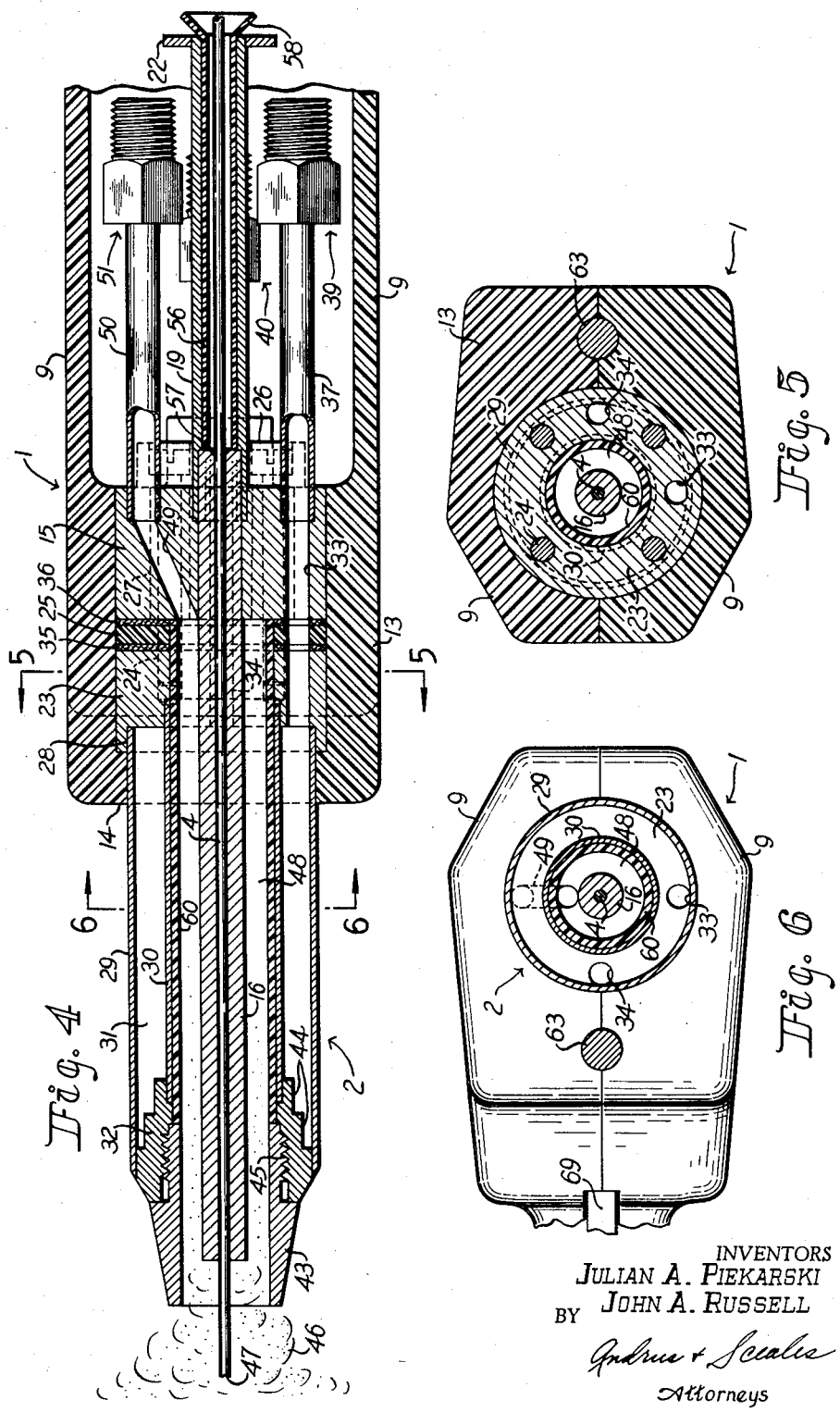

United States Patent Office 2,903,567
Patented Sept. 8, 1959

2,903,567

ARC WELDING APPARATUS

Julian A. Piekarski and John A. Russell, Milwaukee, Wis., assignors to A. O. Smith Corporation, Milwaukee, Wis., a corporation of New York Application December 31, 1956, Serial No. 631,849

4 Claims. (Cl. 219—130)

This invention relates to arc welding apparatus and particularly to a water-cooled electrode nozzle for gas shielded arc welding.

In gas shielded arc welding, an annular stream of gas is fed coaxially with the welding electrode through a welding nozzle to the arc to prevent contamination of the weld. Because the nozzle is maintained in close proximity to the weld, the nozzle is normally water-cooled to prevent damage from the heat of the arc and also to reduce stickage of weld spatter.

In hand welding, the operator holds a welding gun which includes the welding nozzle and manually manipulates the gun to dispose the electrode along the weld line. Consequently, the gun should be light and easily manipulated and should preferably be pencil-like to provide maximum visibility of the weld to the operator.

The welding head or gun of the present invention comprises, in general, an annular water jacket coaxially supported with an electrode contact tube from an insulating casing and support member. A replaceable nozzle tip is secured in heat exchange relation to the forward end closure of the water jacket to cool the nozzle tip. A tubular insulating sleeve is disposed between the water jacket and the contact tube to prevent flashover therebetween which would puncture the water jacket. The sleeve is preferably held within the gun by being clamped between the nozzle tip and an interior gun surface. The necessary power connections and water and gas connection means are all disposed within the casing to insulate the components from the operator.

The present invention provides a rugged, inexpensive welding gun which is light for ease of manipulation and which has a pencil-shaped gas and cooling nozzle for good visibility of the arc.

The drawing furnished herewith illustrates the best mode presently contemplated for carrying out the invention.

In the drawing:

Fig. 4 is an enlarged fragmentary view in section taken on line 4—4 of Fig. 3;

Fig. 5 is a sectional view taken on line 5—5 of Fig. 4; and

Fig. 6 is a view taken on line 6—6 of Fig. 4.

Figure 1:
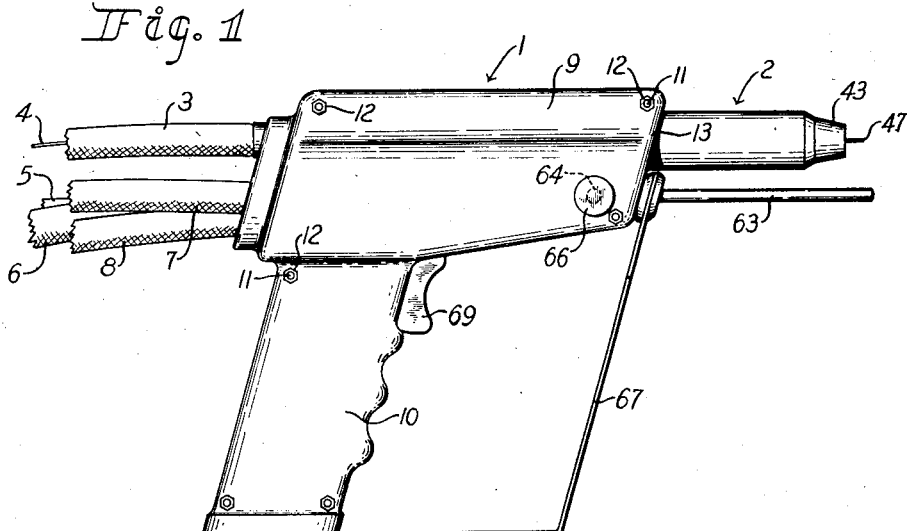
Figure 1 is a side elevational view of a hand welding gun.
Figure 2:
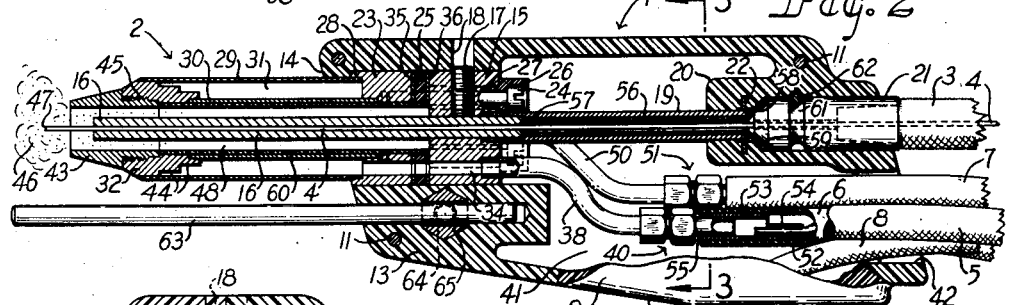
Fig. 2 is an enlarged side view, partly in section and partly in elevation.

Referring to the drawings and particularly to Figs. 1 and 2, the illustrated gun comprises an insulating housing 1 with a gas shielding nozzle assembly 2 extending from the forward end of the housing and an incoming flexible tube 3 secured to the rearward end of the housing. The tube 3 is secured in alignment with the nozzle to establish a guide passage for an electrode 4 which is fed from a remote source, not shown, through the gun to an arc, not shown. An incoming water conduit 5, an outgoing water and power conduit 6, a gas conduit 7 and a control cable 8 extend into the casing 1 adjacent the flexible tube 3 and are connected to the nozzle 2 to totally enclose the various incoming component connections within the housing 1.

The housing 1 is molded of non-conducting material and comprises a hollow rectangular body portion 9 and a hollow depending pistol-type handle or grip 10. As appears in Figs. 1–3, the housing 1 is vertically divided into two similar mating halves which are held together by a plurality of small transverse bolts 11 and nuts 12 disposed about the outer edge of the housing. The forward wall 13 of the housing 1 is relatively deep and is formed with a cylindrical opening which is partially closed by a flange 14 and within which an enlarged portion of the nozzle assembly 2 is disposed to support the assembly 2 on the housing 1.

Referring particularly to Figs. 2 and 4, the nozzle assembly 2 includes a metallic base or terminal block 15 which is disposed within the opening in the forward wall 13 and which is centrally apertured to receive a contact tube 16 of copper or other suitable conducting material. A set screw 17 threads through a suitable tapped lateral opening in the block 15 and bears against the tube 16 to securely hold the tube 16 in place. An opening 18 in the upper wall portion of casing 1 is aligned with the set screw and allows replacement of the contact tube 16 without splitting of the housing 1. A wire guide 19 of a rigid metal is secured within a recess in the back portion of the base block 15 in longitudinal alignment with the contact tube 16 and extends rearwardly to an apertured cylindrical embossment 20 of the housing within which the end 21 of incoming electrode tube 3 is supported. The wire guide 19 is securely mounted within the embossment 20 by an annular flange 22 on the end of guide 19 which mates with a corresponding annular recess in the forward end of the embossment and thereby supports the nozzle assembly 2 against longitudinal movement within housing 1. The forward end of the wire guide 19 which is secured to block 15 is recessed to receive the inner end of contact tube 16 and establishes a locating stop for positioning the tube 16 within the block 15.

Figure 3:
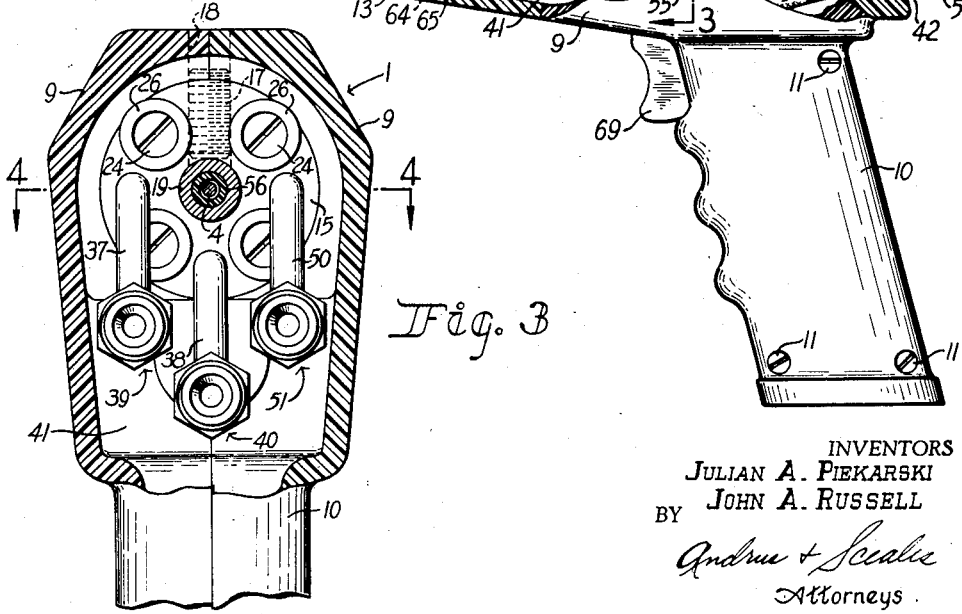
Fig. 3 is a vertical sectional view taken on line 3—3 of Fig. 2.

An annular end closure member 23 having the same diameter as block 15 is disposed within the opening in the forward wall 13 and abuts against the flange 14. The member 23 is secured to the base block 15 in coaxially spaced relation to the contact tube 16 by four equally circumferentially spaced screws 24, as shown in Figs. 2 and 3. The screws 24 extend through the block 15 and thread into suitably tapped openings in the end closure member 23. A disc-shaped insulator 25 of nylon or other suitable material is disposed between the end closure member 23 and block 15, and a cup-shaped insulator 26 having a tubular extension 27 separates the set screws 24 from the base block to electrically isolate the end closure 23 from the base block 15.

Referring particularly to Figs. 2 and 4, the forward end of the closure 23 is recessed to provide an inner ring surface 28 in alignment with the opening defined by the flange 14 in the housing 1. A tube 29 is secured at one end to the ring surface 28 and extends outwardly through the opening in the housing 1. A second tube 30 is secured within a recess in the innermost axial surface of the annular closure 23 and extends coaxially with the tube 29 outwardly through the opening to form an annular water-cooling chamber 31 between the tube 29 and 30 which are joined at their forward ends by an annular closure 32.

Water is admitted to and withdrawn from the water chamber 31 through an inlet passage 33 shown most clearly in Fig. 4 and an outlet passage 34 shown most clearly in Fig. 2. The passages 33 and 34 are formed by aligned longitudinal openings which are circumferentially spaced 90 degrees apart in the terminal block 15, the end closure 23 and nylon separator 25. Suitably apertured sealing gaskets 35 and 36 are disposed to either side of the separator 25 to prevent liquid leakage when the bolts 24 are drawn up. Generally S-shaped conduits 37 and 38 are secured within the rearward ends of the respective passages 33 and 34 in the block 15 and extend rearwardly and downwardly. Threaded couplings 39 and 40 releasably connect the incoming water conduit 5 and the discharge conduit 6 to the respective conduits 37 and 38 within a hollow chamber 41 which is provided in housing 1 immediately beneath and forwardly of the embossment 20. The conduits 5 and 6 enter into chamber 41 through an opening 42 in the rear of housing 1. The water flows in through the incoming water conduit 5, through conduit 37 and passage 33 to the water chamber 31 and then out through the discharge passage 34 and the conduits 38 and 6. In circulating through the chamber 31, the water cools a solid copper nozzle tip 43 which threads into the forward end closure 32 and which is therefore in heat exchange relationship with end closure 32. The end closure 32 is preferably formed of copper or other high heat conducting material to provide efficient transfer of heat from the nozzle tip 43. The surface of end closure 32 within the tubes 29 and 30 is provided with a pair of annular step recesses 44 to provide maximum area contact with the water in chamber 31 and to allow a suitable threaded engagement 45 between nozzle tip 43 and the closure 32 for mechanical strength.

The tubes 29 and 30 extend forwardly somewhat less than the contact tube 16 to dispose the nozzle tip 43 slightly in advance of the contact tube. The nozzle 43 directs a suitable shielding gas 46 to surround the tip 47 of the electrode 4 and therefore the arc, not shown. The shielding gas 46 continuously flows through a gas passage 48 formed about the contact tube 16 by the coaxially spaced inner tube 30 of the cooling chamber 31. As shown in Fig. 4, the gas 46 is introduced into the passage 48 from a passage 49 in the base block 15. The passage 49 extends rearwardly and radially outwardly from the gas passage 48 to a longitudinal recess in the back surface of the block 15 in which one end of a generally S-shaped conduit 50 is secured. The conduit 50 extends rearwardly and downwardly and terminates in a threaded coupling 51 within the chamber 41 in the housing 1 and has the incoming gas line 7 releasably attached thereto. The gas line 7 is connected to a source, not shown, of suitable shielding gas such as carbon dioxide or one of the inert gases to provide a continuous supply of shielding gas 46 to an arc.

Referring to Fig. 2, current to sustain an arc is supplied to the electrode 4 via a power cable 52 secured within the water discharge conduit 6. The cable 52 is secured within the conduit 6 by a tubular metal clip 53 which tightly fits within the conduit. A rearward extension 54 of the clip 53 is crimped about the end of the cable 52 to provide electrical connection between clip 53 and cable 52. A metallic tube 55 is welded or otherwise secured within the forward portion of clip 53 and forms a part of the coupling 40 for the water discharge conduit 6. Therefore, current flows from the cable 52 through the clip 53 to the coupling 51 and then through the discharge conduit 38 to the base or terminal block 15. From the block 15, the current flows to the contact tube 16 which is secured to the block 15 and then to the electrode 4 to maintain an arc, not shown.

To restrict the current application to the electrode 4 lying, at any instant, within the contact tube 16, a fiber liner 56 is disposed within the length of wire guide 19. The liner 56 abuts the contact tube 16 which partially closes the bore of wire guide 19 as at 57. The liner 56 extends rearwardly of the rearward end of wire guide 19 and is flared outwardly as at 58. The flared end of liner 56 is clamped in place between correspondingly chamfered surfaces 59 on the end connector 21 of the flexible tube 3 and the base of recess within which connector 21 is disposed. The flared portion 48 of guide 19 insures the electrical insulation of the incoming connector 21 from the wire guide 19 and, therefore, from the terminal block 15 and restricts current input to the electrode 4 immediately adjacent the tube 16.

During the period of welding, the inner tube 30 of the water jacket is normally neutral. However, if during welding the nozzle 2 engages a grounded member there is a potential difference between the inner tube 30 and the contact tube 16 and electrode 4. This difference in potential tends to establish an arc from the contact tube 16 and electrode 4 to the inner tube 30. If spatter enters the gas passage and sticks to either the tube 30 or tube 16, the distance between the members is shortened and an arc may more readily be established. A discharge or flashover therebetween would puncture the tube 30. To prevent such a flashover, an insulating sleeve 60 is secured circumjacent the tube 30. The sleeve 60 is clamped in position between the nozzle tip 43 and the terminal block 15 when the tip 43 is threaded into end closure 32. The insulating tube 60 thereby protects the entire length of the inner tube 30 and prevents puncturing of tube 30. The sleeve 60 is preferably also such that spatter will not readily adhere to it and thereby prevents a build up of spatter which would interfere with the gas passage and cause turbulence of the gas.

The end connector 21 disposed within the rear wall embossment is a centrally apertured cylindrical member provided with an annular recess 61 on its outer surface. The recess 61 aligns with a transverse opening in the embossment 20 with a through bolt 62 being threaded within the opening and releasably locking the connector 21 within the embossment. To change the electrode 4 to a size which the flexible tube 3 will not pass, the connector 21 is released and a suitable electrode guide tube 3 inserted. The contact tube 16 is also changed accordingly.

To assist the welder in maintaining a constant distance between the electrode and the work, not shown, and therefore a constant arc length, a guide rod 63 is secured within the forward wall 13 of the housing 1 and extends forwardly parallel to the nozzle assembly 2. As shown in Fig. 2, the rod 63 slides within a suitable slot in forward wall portion 13 and is adjustably held in place by a small transverse bolt 64 which extends through a lateral opening in the wall and bears on the rod 63 to securely lock the rod in position. A metal insert 65 is secured as by a force fit within the lateral opening and has an opening which is aligned with the rod receiving slot and also a threaded opening which is perpendicular to the rod receiving opening and which is aligned with the bolt opening in the forward wall to receive the bolt 64. A knurled knob 66, shown in Figure 1, permits manual control of the bolt 64 for adjustment of rod 63.

The hand of the operator is protected from the intense heat of the arc by an L-shaped metal shield 67 which is secured to the bottom of the handle as by a set screw 68 and slidably supported on the rod 63 immediately adjacent the forward end of the casing.

A control trigger 69 is pivotally mounted within a recess in the pistol grip 10 for manual control by the operator and is connected to the control cable 8 which extends outwardly through the back of housing 1. The control cable 8 is connected to suitable control devices, not shown, to simultaneously start the flow of gas and water and complete the electrical power circuit to the electrode 4.

The present invention provides a light, easily manipulated welding gun for gas shielded arc welding having a simple water cooling system.

Various modes of carrying out the invention are contemplated as being within the scope of the following claims particularly pointing out and distinctly claiming the subject matter which is regarded as the invention.

We claim:

1. In an arc welding hand gun adapted to simultaneously direct a consumable electrode and a shielding gas to sustain a welding arc, an electrical insulating casing having a hollow body portion with an opening in the front wall and in the back wall and having a depending handle portion, an electrode contact tube disposed in a recess at the front portion of the body portion and projected forwardly therefrom, means to apply a welding current to said tube, a tube-like electrode guide having a non-conducting inner surface and being rigidly secured to said contact tube and extending rearwardly therefrom to the rear of said body portion and being releasably coupled to the body portion thereat to provide an electrode passage to said contact tube and to rigidly support the contact tube within the casing, said insulating inner surface restricting current input to the electrode at said contact tube, and coupling means disposed within said hollow body and adapted to releasably engage a water inlet and a water outlet and gas inlet and a welding cable which are inserted through the opening in the back wall to insulate the connections.

2. In a hand welding gun for simultaneously and coaxially directing a shielding gas and a consumable electrode to an arc, an insulating casing having a hollow body portion and a laterally depending handle, said body portion having a thick forward wall with a forward opening partially closed by an annular flange, a cylindrical metal support disposed within the opening engaging the flange and having a central longitudinal opening, a contact tube secured within said opening and extending forwardly of the casing, a power cable electrically connected to the metal support to establish current flow through the electrode at the contact tube, a tubular wire guide of a rigid metal secured at one end to the cylindrical support in alignment with said contact tube and extending rearwardly through the casing to the rear wall of the casing, said wire guide having a lateral flange mating with a recess in the rear wall and longitudinally supporting the cylindrical support and contact tube, and an insulating sleeve disposed within the wire guide to restrict current application to the electrode coextensive with the contact tube.

3. In a hand welding gun for consumable electrode arc welding, an insulating casing having a hollow body portion and a laterally depending handle, a recess in the back wall of the body portion adapted to releasably hold an incoming wire guide for said consumable electrode, said casing having an opening in the forward wall of the body portion and a radial flange partially closing said opening, a welding nozzle having a generally cylindrical portion disposed within the opening in the body portion and engaging said flange and having a tubular contact tube extending forwardly from said casing, a rigid tubular wire guide rigdly secured to said cylindrical portion in alignment with said contact tube and extending rearwardly to the back wall, a radial flange on the free end of the wire guide disposed within a slot in the back wall of the casing to support the wire guide and the welding nozzle, and an insulating sleeve extending the length of the wire guide and having a flared end extending out of the back end of the wire guide, said flared end being clamped between the incoming wire guide and the base of said wire guide to insulate the adjacent electrode portion from said contact tube.

4. A manual welding gun for consumable electrode gas shielded arc welding, which comprises a molded casing of lightweight and electrical insulating material and having a body portion and a laterally depending handle portion adjacent the back wall of the casing, said body portion having a thick forward wall with a longitudinal opening partially closed by a ring flange and having a centrally apertured embossment in the rear wall of the casing in alignment with said opening and forming a generally hollow chamber between the front and back wall, a water-cooled welding nozzle disposed within said forward opening and extending forwardly therethrough and having a longitudinal contact tube, a wire guide connected to the inner end of the nozzle in alignment with said longitudinal contact tube and extending rearwardly to the embossment to provide a longitudinal wire passage through the welding gun, means in said embossment to releasably hold an incoming wire casing tube with the incoming wire aligned with the entrance to said longitudinal wire passage, and coupling means operatively connected to the nozzle and disposed within the hollow chamber within said casing to provide releasable connection to a source of circulating water and to a source of shielding gas and to a source of welding power, said casing serving to insulate the connections from the operator.

References Cited in the file of this patent
UNITED STATES PATENTS

| | | |
|---|---|---|
| 1,128,116 | Dralle | Feb. 9, 1915 |
| 2,333,192 | Moberg | Nov. 2, 1943 |
| 2,440,696 | Patterson | May 4, 1948 |
| 2,510,415 | Pitcher | June 6, 1950 |
| 2,673,278 | Anderson | Mar. 23, 1954 |
| 2,719,899 | Schwarting | Oct. 4, 1955 |
| 2,727,970 | Turbett | Dec. 20, 1955 |
| 2,761,049 | McElrath et al. | Aug. 28, 1956 |